United States Patent
Chang et al.

(10) Patent No.: US 9,772,756 B2
(45) Date of Patent: Sep. 26, 2017

(54) DISPLAY DRIVER AND METHOD FOR ADJUSTING COLOR TEMPERATURE OF IMAGE

(71) Applicant: Novatek Microelectronics Corp., Hsinchu (TW)

(72) Inventors: Kuei-Chung Chang, Hsinchu County (TW); Wan-Yu Kuo, Hsinchu County (TW); Tzu-Chu Yin, Taichung (TW); Chun-Ta Wu, New Taipei (TW); I-Te Liu, Chiayi County (TW)

(73) Assignee: Novatek Microelectronics Corp., Hsinchu (TW)

(*) Notice: Subject to any disclaimer, the term of this patent is extended or adjusted under 35 U.S.C. 154(b) by 142 days.

(21) Appl. No.: 14/727,763

(22) Filed: Jun. 1, 2015

(65) Prior Publication Data
US 2016/0351165 A1     Dec. 1, 2016

(51) Int. Cl.
G09G 5/02       (2006.01)
G06F 3/0484     (2013.01)
G09G 3/20       (2006.01)

(52) U.S. Cl.
CPC ....... *G06F 3/04842* (2013.01); *G09G 3/2003* (2013.01); *G09G 2320/0276* (2013.01); *G09G 2320/0606* (2013.01); *G09G 2320/0666* (2013.01); *G09G 2320/0673* (2013.01)

(58) Field of Classification Search
CPC .... G09G 5/02; G09G 5/30; G09G 2320/0606; G09G 2320/0666; G09G 2320/0673
See application file for complete search history.

(56) References Cited

U.S. PATENT DOCUMENTS

| | | | |
|---|---|---|---|
| 6,359,389 B1 * | 3/2002 | Medina | G09G 3/2011 315/169.1 |
| 6,862,012 B1 | 3/2005 | Funakoshi et al. | |
| 2002/0063666 A1 | 5/2002 | Kang et al. | |

(Continued)

FOREIGN PATENT DOCUMENTS

| | | |
|---|---|---|
| CN | 101527549 | 9/2009 |
| TW | 201042630 | 12/2010 |
| TW | 201126489 | 8/2011 |

OTHER PUBLICATIONS

"Office Action of Taiwan Counterpart Application", dated Apr. 26, 2016, p. 1-p. 7.

*Primary Examiner* — Charles Tseng
(74) *Attorney, Agent, or Firm* — Jianq Chyun IP Office

(57) ABSTRACT

A display driver configured to drive a display panel to display an image is provided. The display driver includes an interpolation operation unit and a gamma circuit. The interpolation operation unit is configured to receive two gamma reference curves, and perform an interpolation operation on the two gamma reference curves to generate a plurality of gamma curves. The gamma circuit is configured to select one of the generated gamma curves based on a user selection signal, and drive the display panel to display the image based on the selected gamma curve, so as to adjust a color temperature of the image based on the user selection signal. Color temperatures of the generated gamma curves are distinct, and the generated gamma curves have the same gamma value. Furthermore, a method for adjusting a color temperature of an image is also provided.

15 Claims, 8 Drawing Sheets

(56) References Cited

U.S. PATENT DOCUMENTS

| | | | |
|---|---|---|---|
| 2005/0007393 A1* | 1/2005 | Akai | G09G 3/3233 |
| | | | 345/690 |
| 2005/0134525 A1* | 6/2005 | Tanghe | G06F 3/1446 |
| | | | 345/1.1 |
| 2006/0267985 A1* | 11/2006 | Brodie | G06T 11/206 |
| | | | 345/442 |
| 2007/0176870 A1* | 8/2007 | Hung | G09G 3/3413 |
| | | | 345/88 |
| 2008/0122814 A1* | 5/2008 | Shin | G09G 3/3648 |
| | | | 345/204 |
| 2008/0252794 A1* | 10/2008 | Su | G09G 5/02 |
| | | | 348/739 |
| 2010/0295874 A1 | 11/2010 | Liu et al. | |
| 2011/0175942 A1 | 7/2011 | Ahn et al. | |
| 2015/0154929 A1* | 6/2015 | Li | G09G 3/3611 |
| | | | 345/212 |

\* cited by examiner

DISPLAY DRIVER AND METHOD FOR ADJUSTING COLOR TEMPERATURE OF IMAGE

BACKGROUND OF THE DISCLOSURE

1. Field of the Disclosure

The disclosure generally relates to a driver circuit and an image adjusting method, in particular, to a display driver and a method for adjusting a color temperature of an image.

2. Description of Related Art

In recent years, portable devices such as smart phones or tablets are usually equipped with the color temperature adjusting functionality to satisfy user requirements. Besides cold color, daylight color, and warm color, a plurality of color temperatures between them are necessary to provide different visual effects. In related arts, two methods are mainly used to adjust color temperatures of images. One method is changing raw data of the images. The raw data of the images is transformed by using the white balance of the sRGB color space. However, some colors may be missed by using this method because one portion of colors is mapping to another portion of colors.

Another method for adjusting color temperatures of images is changing the setting of gamma voltages. That is, gamma values of a gamma curve for driving the display panel may be changed. By changing the setting of gamma voltages, the brightness of the images is changed, and the color missing issue may be improved since the color information of the images is not transformed. However, once the gamma values of the gamma curve are changed, the brightness difference between the images which have difference color temperatures is significant. Therefore, a desirable method for better adjusting the color temperatures of the images is necessary for providing a good user experience.

SUMMARY OF THE DISCLOSURE

Accordingly, the disclosure is directed to a display driver and a method for adjusting a color temperature of an image. The display driver is configured to drive a display panel to display an image and capable of adjusting a color temperature of the image by using the method.

An exemplary embodiment of the disclosure provides a display driver configured to drive a display panel to display an image. The display driver includes an interpolation operation unit and a gamma circuit. The interpolation operation unit is configured to receive two gamma reference curves, and perform an interpolation operation on the two gamma reference curves to generate a plurality of gamma curves. The gamma circuit is electrically connected to the interpolation operation unit. The gamma circuit is configured to select one of the generated gamma curves based on a user selection signal, and drive the display panel to display the image based on the selected gamma curve, so as to adjust a color temperature of the image based on the user selection signal. Color temperatures of the generated gamma curves are distinct, and the generated gamma curves have the same gamma value.

According to an exemplary embodiment of the disclosure, the display driver further includes a first selector unit. The first selector unit is electrically connected to the interpolation operation unit. The first selector unit is configured to select at least one gamma reference curve from a plurality of preset gamma curves for the two gamma reference curves based on a gamma selection signal, and output the at least one gamma reference curve selected by the first selector unit to the interpolation operation unit.

According to an exemplary embodiment of the disclosure, the preset gamma curves includes a first gamma curve, a second gamma curve, and a third gamma curve. A color temperature of the first gamma curve is greater than a color temperature of the second gamma curve, and the color temperature of the second gamma curve is greater than a color temperature of the third gamma curve. The first selector unit selects the first gamma curve or the third gamma curve for one of the two gamma reference curves based on the gamma selection signal. The interpolation operation unit receives the second gamma curve for another one of the two gamma reference curves.

According to an exemplary embodiment of the disclosure, the preset gamma curves includes a fourth gamma curve and a fifth gamma curve. A color temperature of the fourth gamma curve is greater than a color temperature of the fifth gamma curve. The first selector unit selects the fourth gamma curve and the fifth gamma curve for the two gamma reference curves based on the gamma selection signal.

According to an exemplary embodiment of the disclosure, the display driver further includes a second selector unit. The second selector unit is electrically connected to the interpolation operation unit. The second selector unit is configured to select a plurality of gamma curves from the generated gamma curves based on a gamma selection signal. Color temperatures of the gamma curves selected by the second selector unit are distributed at substantially equal temperature intervals.

According to an exemplary embodiment of the disclosure, the gamma circuit gradually adjusts the color temperature of the image frame by frame based on the user selection signal.

According to an exemplary embodiment of the disclosure, the gamma circuit includes a third selector unit and a gamma voltage generating unit. The third selector unit is electrically connected to the second selector unit. The third selector unit is configured to select one gamma curve from the gamma curves selected by the second selector unit based on the user selection signal. The gamma voltage generating unit is electrically connected to the third selector unit. The gamma voltage generating unit is configured to generate gamma voltages to drive the display panel based on the gamma curve selected by the third selector unit.

According to an exemplary embodiment of the disclosure, the gamma circuit includes a third selector unit and a gamma voltage generating unit. The third selector unit is electrically connected to the interpolation operation. The third selector unit is configured to select one gamma curve from the gamma curves generated by the interpolation operation based on the user selection signal. The gamma voltage generating unit is electrically connected to the third selector unit. The gamma voltage generating unit is configured to generate gamma voltages to drive the display panel based on the gamma curve selected by the third selector unit.

According to an exemplary embodiment of the disclosure, the display driver further includes a memory storage unit. The memory storage unit is electrically connected to the interpolation operation unit. The memory storage unit is configured to store the preset gamma curves. The two gamma reference curves are selected from the preset gamma curves and outputted to the interpolation operation unit.

According to an exemplary embodiment of the disclosure, a number of the stored preset gamma curves is less than a number of the generated gamma curves.

An exemplary embodiment of the disclosure provides a method for adjusting a color temperature of an image. The method includes: performing an interpolation operation on the two gamma reference curves to generate a plurality of gamma curves; selecting one of the generated gamma curves based on a user selection signal; driving the display panel to display the image based on the selected gamma curve, so as to adjust the color temperature of the image based on the user selection signal. Color temperatures of the generated gamma curves are distinct, and the generated gamma curves have the same gamma value.

According to an exemplary embodiment of the disclosure, the method further includes: selecting at least one gamma reference curve from a plurality of preset gamma curves for the two gamma reference curves based on a gamma selection signal.

According to an exemplary embodiment of the disclosure, the preset gamma curves includes a first gamma curve, a second gamma curve, and a third gamma curve. A color temperature of the first gamma curve is greater than a color temperature of the second gamma curve, and the color temperature of the second gamma curve is greater than a color temperature of the third gamma curve. The step of selecting the at least one gamma reference curve from the preset gamma curves for the two gamma reference curves includes: selecting the first gamma curve or the third gamma curve for one of the two gamma reference curves based on the gamma selection signal; and receiving the second gamma curve for another one of the two gamma reference curves.

According to an exemplary embodiment of the disclosure, the preset gamma curves includes a fourth gamma curve and a fifth gamma curve. A color temperature of the fourth gamma curve is greater than a color temperature of the fifth gamma curve. The step of selecting the at least one gamma reference curve from the preset gamma curves for the two gamma reference curves includes: selecting the fourth gamma curve and the fifth gamma curve for the two gamma reference curves based on the gamma selection signal.

According to an exemplary embodiment of the disclosure, the method further includes: selecting a plurality of gamma curves from the generated gamma curves based on a gamma selection signal. Color temperatures of the gamma curves selected by the second selector unit are distributed at substantially equal temperature intervals.

According to an exemplary embodiment of the disclosure, the color temperature of the image is adjusted frame by frame based on the user selection signal.

According to an exemplary embodiment of the disclosure, in the step of selecting the one of the generated gamma curves based on the user selection signal, one gamma curve is selected from the selected gamma curves based on the user selection signal. In the step of driving the display panel to display the image based on the selected gamma curve, gamma voltages are generated to drive the display panel based on the selected gamma curve.

According to an exemplary embodiment of the disclosure, in the step of selecting the one of the generated gamma curves based on the user selection signal, one gamma curve is selected from the generated gamma curves based on the user selection signal. In the step of driving the display panel to display the image based on the selected gamma curve, gamma voltages are generated to drive the display panel based on the selected gamma curve.

According to an exemplary embodiment of the disclosure, the method further includes: storing the preset gamma curves. The two gamma reference curves are selected from the preset gamma curves. A number of the stored preset gamma curves is less than a number of the generated gamma curves.

Based on the above, in the exemplary embodiments of the disclosure, the gamma circuit selects one of the gamma curves generated by the interpolation operation unit based on the user selection signal, so as to adjust the color temperature of the image based on the user selection signal.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
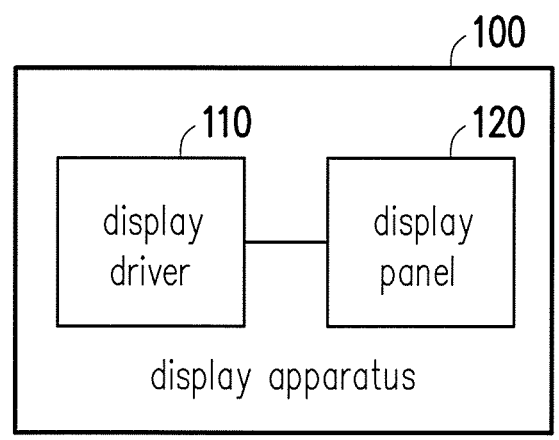
FIG. 1 illustrates a schematic diagram of a display apparatus according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

The disclosure is described below by means of a plurality of embodiments. However, the disclosure is not limited to the illustrated embodiments. Further, the following embodiments may be adaptively combined, replaced or omitted under reasonable circumstances to meet different practical needs. Throughout the full context of the description and the claims, the word "couple" in the description and claims may refer to any direct or indirect connection. For instance, in the description and claims, if a first device is coupled to a second device, it means that the first device may be directly connected to the second device or may indirectly connected to the second device through another device or by another connection means. In addition, the word "signal" may refer to at least one current signal, voltage signal, electric charge signal, temperature signal, data signal or any one or more signals.

Figure 2:
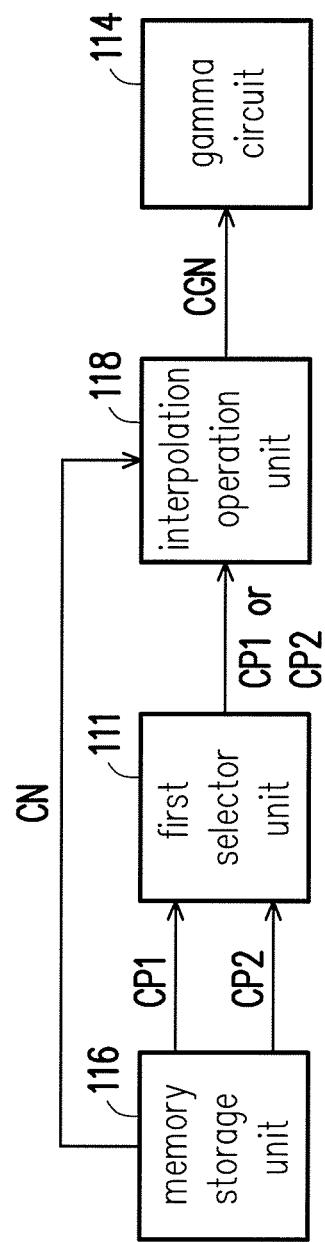
FIG. 2 illustrates a schematic diagram of the display driver of FIG. 1 according to an exemplary embodiment of the disclosure.
Figure 3:
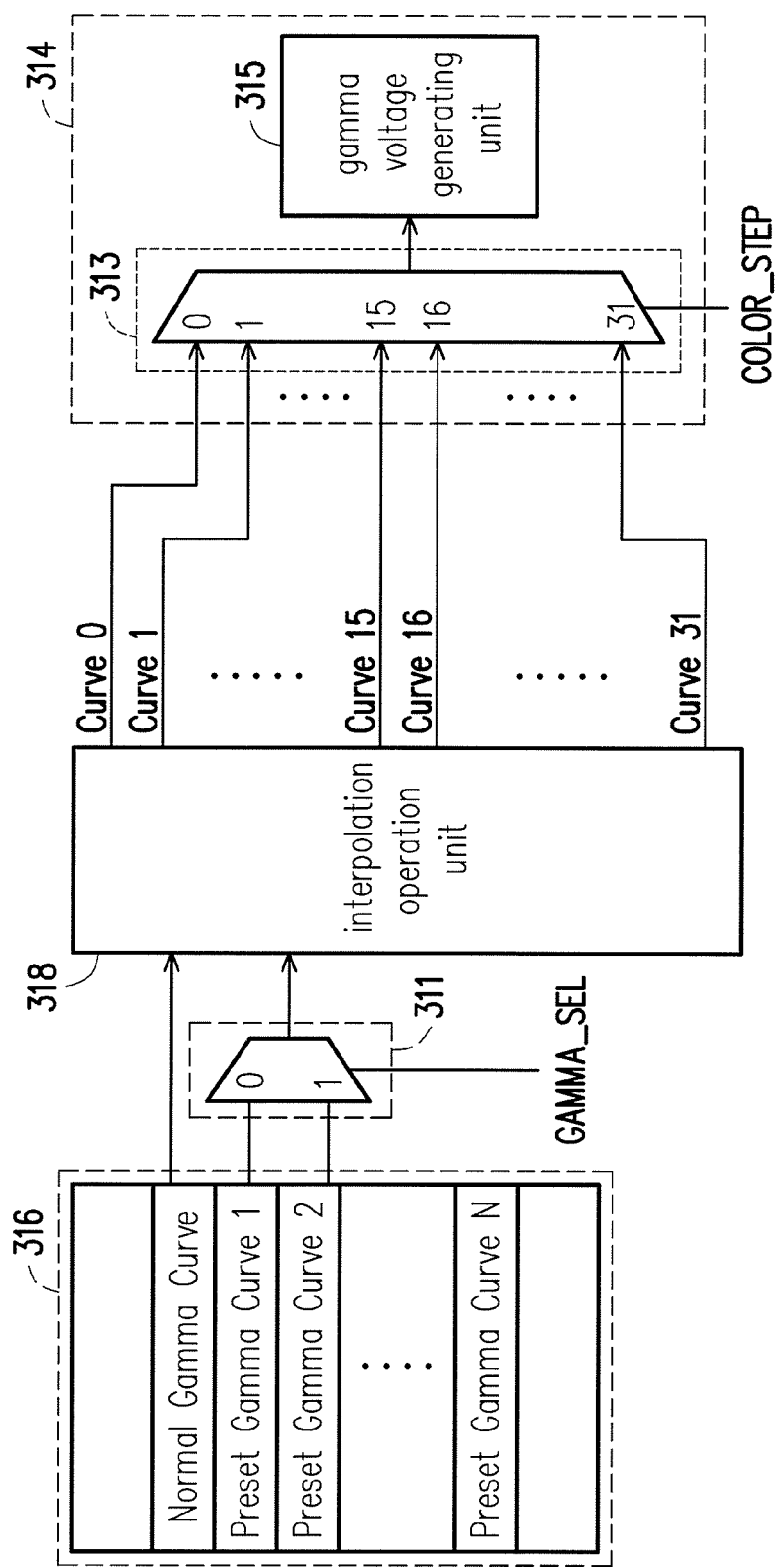
FIG. 3 illustrates a schematic diagram of the display driver of FIG. 1 according to another exemplary embodiment of the disclosure.

FIG. 1 illustrates a schematic diagram of a display apparatus according to an exemplary embodiment of the disclosure. FIG. 2 illustrates a schematic diagram of the display driver of FIG. 1 according to an exemplary embodiment of the disclosure. Referring to FIG. 1 and FIG. 2, the display apparatus 100 includes a display driver 110 and a display panel 120. The display panel 120 is electrically connected to the display driver 110. The display driver 110 is configured to drive the display panel 120 to display an image. In the present embodiment, the display driver 110 is capable of adjusting a color temperature of the image based on a user selection signal COLOR_STEP as illustrated in FIG. 3, to satisfy user requirements.

In the present embodiment, the display apparatus 100 may be a portable apparatus, such as a smart phone, a tablet, a personal digital assistant (PDA), a laptop computer, and so on, or a non-portable apparatus, such as a smart television, a desktop computer, a flat panel display, and so on, but the disclosure is not limited thereto. Furthermore, in the present embodiment, the display panel 120 may be a flat panel display panel, such as a liquid crystal display (LCD) panel or an organic light emitting device (OLED) panel, but the disclosure is not limited thereto.

Referring to FIG. 2, the display driver 110 includes an interpolation operation unit 118, a gamma circuit 114, a memory storage unit 116, and a first selector unit 111 in the present embodiment. In the present embodiment, the interpolation operation unit 118 receives two gamma reference curves, e.g. curves CN and CP1 or CP2, from at least one of the memory storage unit 116 and the first selector unit 111. Next, the interpolation operation unit 118 performs an interpolation operation on the two gamma reference curves to generate a plurality of gamma curves CGN. The generated gamma curves CGN are outputted to the gamma circuit 114. In the present embodiment, color temperatures of the generated gamma curves CGN are distinct, and the generated gamma curves CGN have the same gamma value, e.g. a gamma value 2.2. In addition, the interpolation operation unit 118 may include an interpolation circuit capable of performing the interpolation operation. In one exemplary embodiment, the interpolation operation unit 118 may, for example, include a central processing unit (CPU), a microprocessor, a digital signal processor (DSP), a programmable controller, a programmable logic device (PLD) or other similar devices or a combination of the above devices.

The memory storage unit 116 is electrically connected to the interpolation operation unit 118 via the first selector unit 111. The memory storage unit 116 stores a plurality of preset gamma curves. The first selector unit 111 selects at least one gamma reference curve from the preset gamma curves stored in the memory storage unit 116 for the two gamma reference curves, and outputs the at least one gamma reference curve selected thereby to the interpolation operation unit 118. In one exemplary embodiment, the first selector unit 111 may select two gamma curves from the preset gamma curves to serve as gamma reference curves. Alternatively, in another exemplary embodiment, the first selector unit 111 may select one gamma reference curve from the preset gamma curves, and another gamma reference curve may be directly outputted to the interpolation operation unit 118 from the memory storage unit 116 without being selected via the first selector unit 111.

Next, the gamma circuit 114 receives the gamma curves generated by the interpolation operation unit 118. The gamma circuit 114 selects one of the generated gamma curves based on the user selection signal COLOR_STEP. The gamma circuit 114 drives the display panel 120 to display the image based on the selected gamma curve, so as to adjust the color temperature of the image based on the user selection signal COLOR_STEP. In the present embodiment, the color temperature of the gamma curve is indicative of the color temperature of the image that the gamma circuit 114 drives the display panel 120 to display by the gamma curve.

FIG. 3 illustrates a schematic diagram of the display driver of FIG. 1 according to another exemplary embodiment of the disclosure. Referring to FIG. 3, the memory storage unit 316 may include a multiple time programmable (MTP) memory cell for storing a plurality of preset gamma curves, but the disclosure is not limited thereto. In the present embodiment, the preset gamma curves stored in the memory storage unit 316 may include a normal gamma curve and a preset gamma curve 1 to a preset gamma curve N, where N is an integer larger than 1. The number of the preset gamma curves stored in the memory storage unit 316 does not limit the disclosure.

In the present embodiment, the first selector unit 311 may include a 2-to-1 selector for selecting the preset gamma curve 1 or the preset gamma curve 2 to serve as one of the two gamma reference curve based on a gamma selection signal GAMMA_SEL. The first selector unit 311 outputs the selected gamma reference curve, i.e. the preset gamma curve 1 or the preset gamma curve 2, to the interpolation operation unit 318. On the other hand, the normal gamma curve is directly outputted to the interpolation operation unit 318 to serve as another one of the two gamma reference curve without being selected by the first selector unit 311. In the present embodiment, a color temperature of the preset gamma curve 1 is greater than that of the normal gamma curve, and the color temperature of the normal gamma curve is greater than a color temperature of the preset gamma curve 2, but the disclosure is not limited thereto. In one exemplary embodiment, the color temperatures of the preset gamma curve 1 and the preset gamma curve 2 may be both greater than that of the normal gamma curve. Alternatively, the color temperatures of the preset gamma curve 1 and the preset gamma curve 2 may be both smaller than that of the normal gamma curve.

In the present embodiment, the first selector unit 311 receiving the preset gamma curve 1 and the preset gamma curve 2 is exemplary for description, and the disclosure is not limited thereto. In other exemplary embodiments, the first selector unit 311 may receive any two of the preset gamma curves 1 to N, and select one of them for the interpolation operation unit 318. Furthermore, in one exemplary embodiment, the first selector unit 311 may include an N-to-1 selector receiving the preset gamma curve 1 to the preset gamma curve N for selecting one of them to serve as a gamma reference curve. The implementation of the interpolation operation unit 318 does not limit the disclosure.

In the present embodiment, the interpolation operation unit 318 performs an interpolation operation on the two gamma reference curves to generate a plurality of gamma curves. For example, the interpolation operation unit 318 may receive the preset gamma curve 1 and the normal gamma curve. The color temperature of the preset gamma curve 1 is colder than that of the normal gamma curve. The interpolation operation unit 318 may perform the interpolation operation on the preset gamma curve 1 and the normal gamma curve to generate 16 gamma curves, e.g. Curve 0 to Curve 15. Next, the interpolation operation unit 318 may receive the preset gamma curve 2 and the normal gamma curve. The color temperature of the preset gamma curve 2 is warmer than that of the normal gamma curve. The interpolation operation unit 318 may perform the interpolation operation on the preset gamma curve 2 and the normal gamma curve to generate other 16 gamma curves, e.g. Curve 16 to Curve 31. In the present embodiment, the interpolation operation unit 318 outputs the generated gamma curves, e.g. Curve 0 to Curve 31, to the gamma circuit 314. In this case, the generated gamma curves Curve 0 to Curve 31 may include the preset gamma curve 1 and the preset gamma curve 2. For example, the generated gamma curve Curve 0 is the preset gamma curve 1, and the generated gamma curve Curve 31 is the preset gamma curve 2. It should be noted that the number of the gamma curves generated by the interpolation operation unit 318 does not limit the disclosure.

In one exemplary embodiment, the memory storage unit 316 may simply store the preset gamma curve 1, the preset gamma curve 2 and the normal gamma curve. The interpolation operation unit 318 generates the gamma curves based on the preset gamma curve 1, the preset gamma curve 2 and the normal gamma curve. Accordingly, the number of the stored preset gamma curves, e.g. 3, is less than the number of the generated gamma curves, e.g. 32.

In the present embodiment, the gamma circuit 314 includes a third selector unit 313 and a gamma voltage generating unit 315. The third selector unit 313 is electrically connected to the interpolation operation 318. The third selector unit 313 is configured to select one gamma curve from the gamma curves Curve 0 to Curve 31 generated by the interpolation operation 318 based on the user selection signal COLOR_STEP. In the present embodiment, the third selector unit 313 may include a 32-to-1 selector for selecting one of the gamma curves Curve 0 to Curve 31 based on the user selection signal COLOR_STEP, but the disclosure is not limited thereto.

The gamma voltage generating unit 315 is electrically connected to the third selector unit 313. The gamma voltage generating unit 315 is configured to generate gamma voltages to drive the display panel 120 based on the gamma curve selected by the third selector unit 313. The gamma voltage generating unit 315 may include a string of resistors coupled in series for dividing a reference voltage to generate the gamma voltages based on the selected gamma curve.

For example, the display panel 120 may display an image in a normal mode. In the normal mode, the display driver 310 drives the display panel 120 to display the image based on the normal gamma curve. To satisfy user requirements, the color temperature of the image is adjustable based on the user selection signal COLOR_STEP. For color temperature adjusting, the display driver 310 adjusts the color temperature of the image frame by frame based on the user selection signal COLOR_STEP during a preset gamma dimming period. Once the gamma curve selected by the third selector unit 313 is determined, the display driver 310 may drive the display panel 120 to display the image based on the selected gamma curve, such as one of the gamma curves Curve 0 to Curve 31, in a preset gamma mode. Accordingly, in the present embodiment, the display driver 310 is capable of adjusting the color temperature of the image based on the user selection signal COLOR_STEP to satisfy user requirements.

Figure 4:
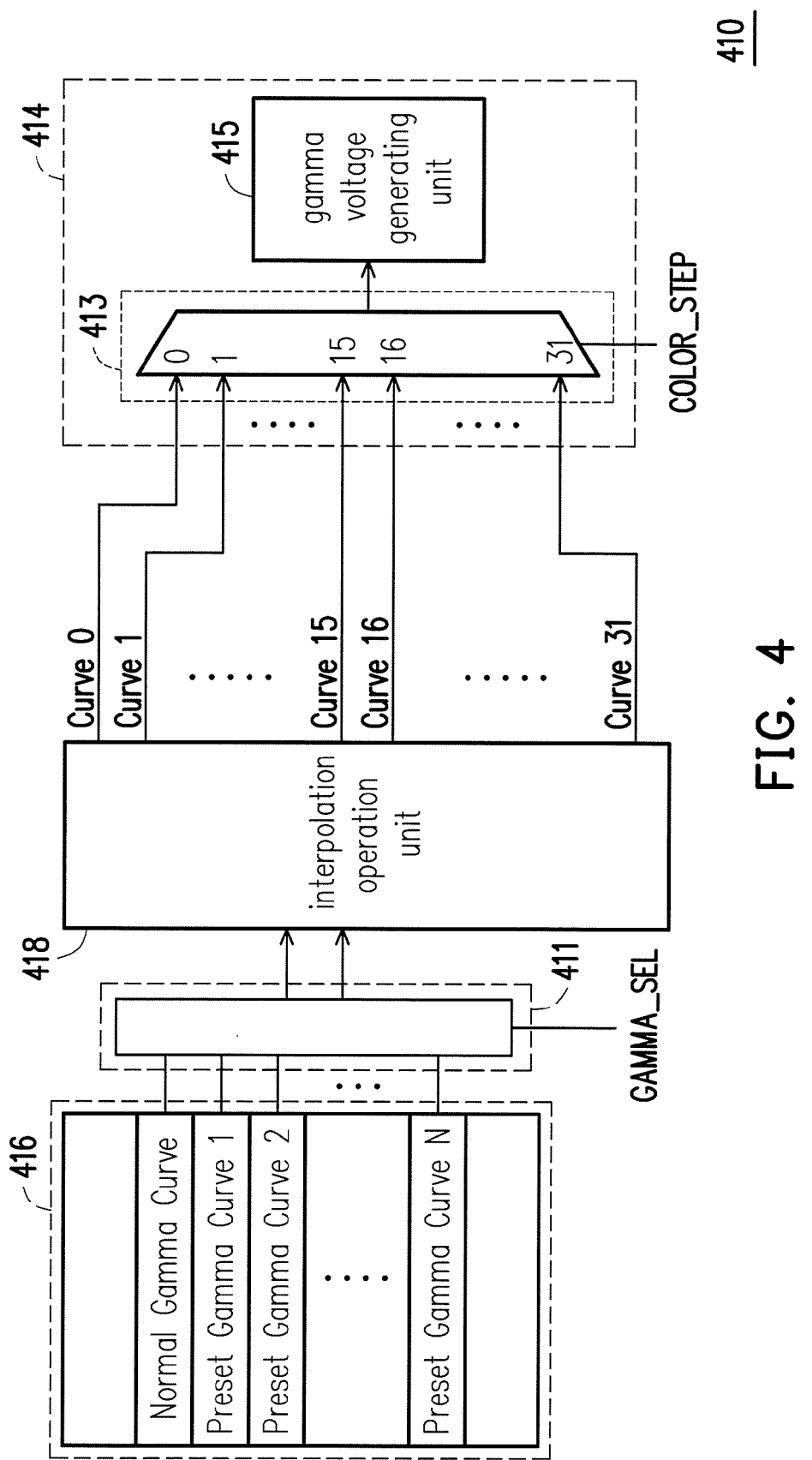
FIG. 4 illustrates a schematic diagram of the display driver of FIG. 1 according to another exemplary embodiment of the disclosure.

FIG. 4 illustrates a schematic diagram of the display driver of FIG. 1 according to another exemplary embodiment of the disclosure. Referring to FIG. 3 and FIG. 4, the display driver 410 of the present embodiment is similar to the display driver 310 illustrated in FIG. 3. The main difference therebetween, for example, lies in the selection scheme of the first selector unit 411.

To be specific, the first selector unit 411 may include an (N+1)-to-2 decoder having N+1 input terminals and 2 output terminals for selecting two gamma reference curves from the normal gamma curve and the preset gamma curve 1 to the preset gamma curve N based on the gamma selection signal GAMMA_SEL in the present embodiment. In the present embodiment, the two gamma reference curves selected from the normal gamma curve and the preset gamma curve 1 to the preset gamma curve N may have different color temperatures. One color temperature is colder or warmer than another. Besides, other operations of the display driver 410 for adjusting the color temperature of the image described in the present embodiment of the disclosure is sufficiently taught, suggested, and embodied in the exemplary embodiment illustrated in FIG. 3, and therefore no further description is provided herein.

Figure 5:
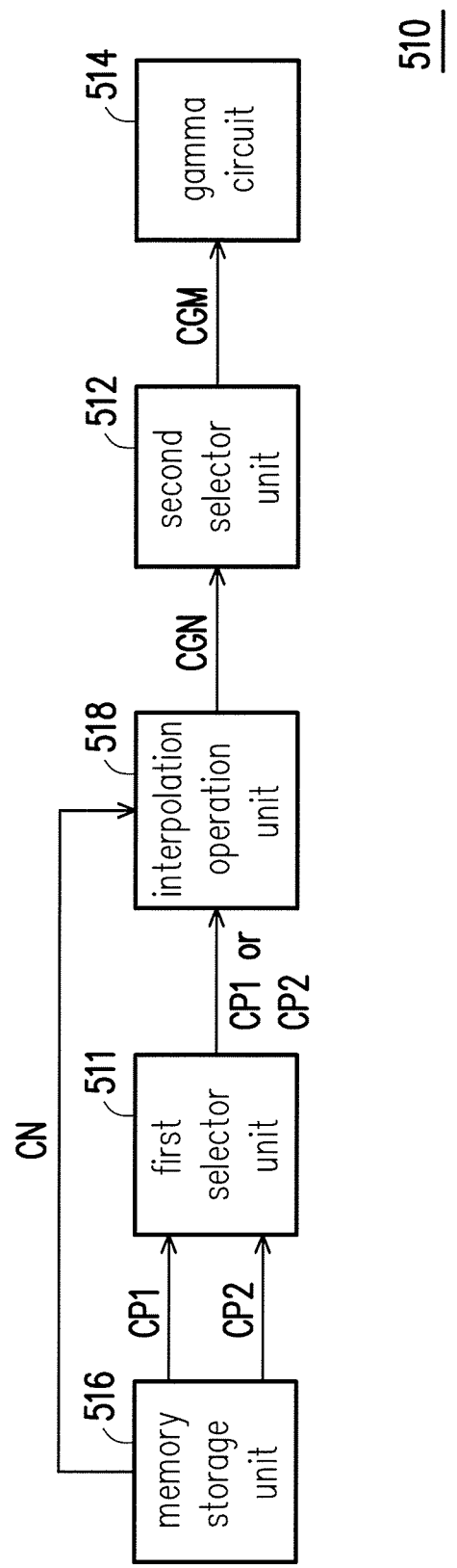
FIG. 5 illustrates a schematic diagram of the display driver of FIG. 1 according to another exemplary embodiment of the disclosure.

FIG. 5 illustrates a schematic diagram of the display driver of FIG. 1 according to another exemplary embodiment of the disclosure. Referring to FIG. 2 and FIG. 5, the display driver 510 of the present embodiment is similar to the display driver 110 illustrated in FIG. 2. The main difference therebetween, for example, lies in that the display driver 510 further includes a second selector unit 512. The second selector unit 512 is electrically connected to the interpolation operation unit 518.

To be specific, after the interpolation operation, the interpolation operation unit 518 may generate a plurality of gamma curves CGN based on two of the curves CN, CP1, CP2, and outputs the generated gamma curves CGN to the second selector unit 512. In the present embodiment, the second selector unit selects a plurality of gamma curves CGM from the generated gamma curves CGN, and outputs the selected gamma curves CGM to the gamma circuit 514. In the present embodiment, color temperatures of the gamma curves CGM selected by the second selector unit 512 are distributed at substantially equal temperature intervals, e.g. 300K, but the disclosure is not limited thereto. The gamma circuit 514 may gradually adjust the color temperature of the image frame by frame for smoothing the variation of the color temperature to provide a better user experience.

Figure 6:
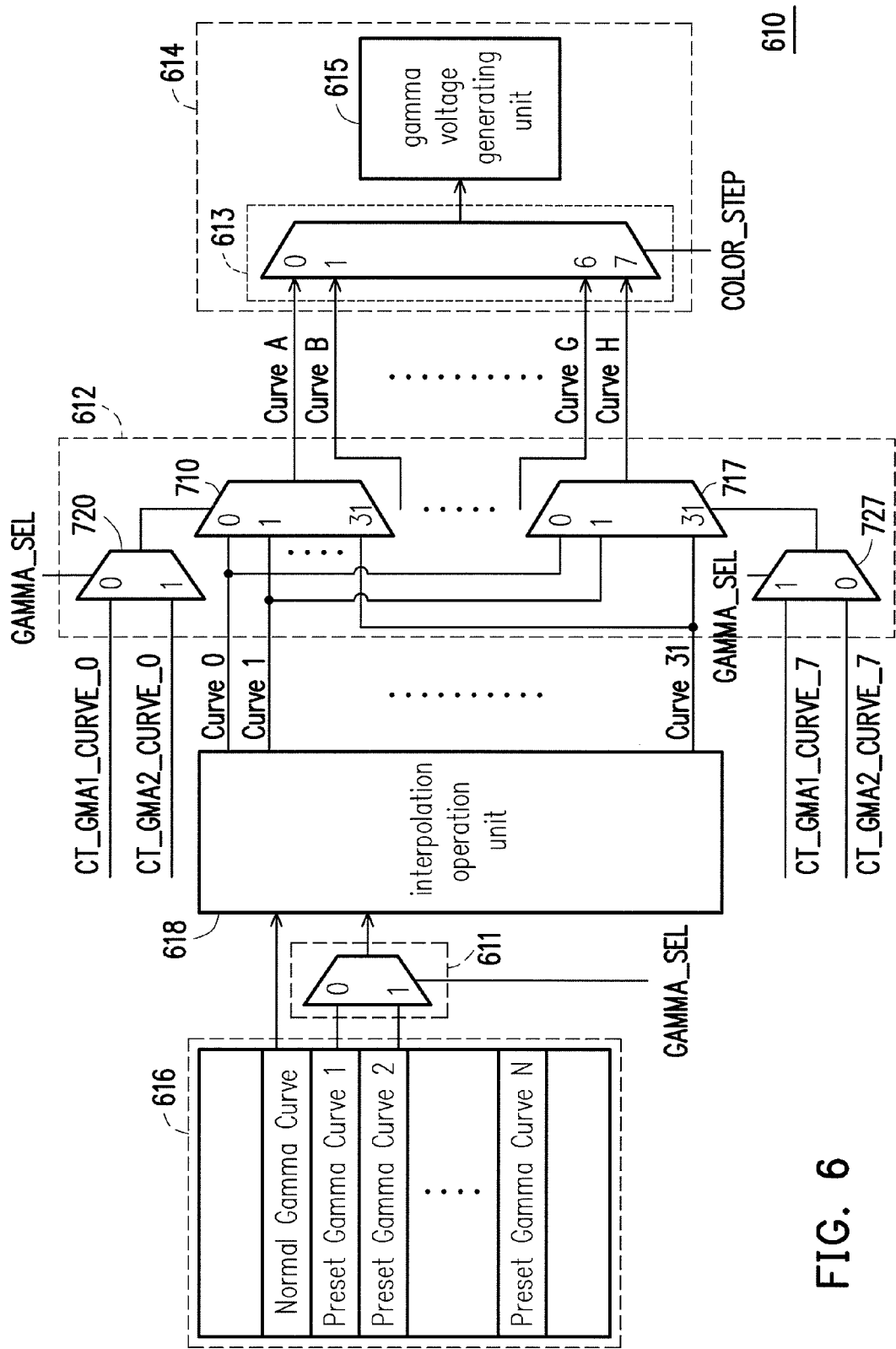
FIG. 6 illustrates a schematic diagram of the display driver of FIG. 1 according to another exemplary embodiment of the disclosure.

FIG. 6 illustrates a schematic diagram of the display driver of FIG. 1 according to another exemplary embodiment of the disclosure. Referring to FIG. 3 and FIG. 6, the display driver 610 of the present embodiment is similar to the display driver 310 illustrated in FIG. 3. The main difference therebetween, for example, lies in that the display driver 610 further includes a second selector unit 612, and the third selector unit 613 includes an 8-to-1 selector.

To be specific, the interpolation operation unit 618 of the present embodiment generates the gamma curves, e.g. Curve 0 to Curve 31, based on two gamma reference curves, and further outputs the generated gamma curves to the second selector unit 612. In the present embodiment, the second selector unit 612 may include a plurality of selectors 710 to 717 and 720 to 727 to select gamma curves Curve A to Curve H from the gamma curves Curve 0 to Curve 31 based on the gamma selection signal GAMMA_SEL. Color temperatures of the gamma curves Curve A to Curve H selected by the second selector unit 612 may be distributed at substantially equal temperature intervals. That is, the temperature intervals between the color temperatures of the gamma curves Curve A to Curve H are substantially equal in the present embodiment. For example, among the color temperatures of the gamma curves Curve A to Curve H, the color temperature of the gamma curve Curve B may be next to the color temperature of the gamma curve Curve A, and the color temperature of the gamma curve Curve H may be next to the color temperature of the gamma curve Curve G. In one exemplary embodiment, the temperature interval between the color temperature of the gamma curve Curve A and the color temperature of the gamma curve Curve B is about 300K, the temperature interval between the color temperature of the gamma curve Curve G and the color temperature of the gamma curve Curve H is also about 300K, and they are substantially equal. The relationship of other temperature intervals between the color temperatures of the remaining gamma curves may be deduced by analogy, and therefore no further description is provided herein.

In the present embodiment, the selector 710 is a 32-to-1 selector for receiving the gamma curves Curve 0 to Curve 31 and selectively transmitting one of the gamma curves Curve 0 to Curve 31 based on the gamma selection signal CT_GMA1_CURVE_0 or CT_GMA2_CURVE_0. The selector 720 is a 2-to-1 selector connected to the selector 710 and for selecting and outputting the gamma selection signal CT_GMA1_CURVE_0 or CT_GMA2_CURVE_0 to the selector 710 based on the gamma selection signal GAMMA_SEL. For example, the selector 720 may output the gamma selection signal CT_GMA1_CURVE_0 to the selector 710 based on the gamma selection signal GAMMA_SEL. The selector 710 may select one gamma curve from the gamma curves Curve 0 to Curve 31 based on the gamma selection signal CT_GMA1_CURVE_0, and output the selected gamma curve to the gamma circuit 614. Accordingly, the selector 710 selects one gamma curve from the gamma curves Curve 0 to Curve 31 to serve as the gamma curve Curve A, and further outputs the gamma curve Curve A to the gamma circuit 614. The operation of other selectors, such as the selectors 711 (not shown) to 717, may be deduced by analogy from that of the selector 710, and therefore no further description is provided herein. In the present embodiment, the gamma selection signals CT_GMA1_CURVE_0 to CT_GMA1_CURVE_7 for respectively controlling the selectors 710 to 711 may correspond to eight gamma curves of the gamma curves Curve 0 to Curve 31, and the gamma selection signals CT_GMA2_CURVE_0 to CT_GMA2_CURVE_7 for respectively controlling the selectors 710 to 711 may correspond to other eight gamma curves of the gamma curves Curve 0 to Curve 31. The selectors 720 to 727 may output the gamma selection signals CT_GMA1_CURVE_0 to CT_GMA1_CURVE_7 or the gamma selection signals CT_GMA2_CURVE_0 to CT_GMA2_CURVE_7 to control the selectors 710 to 711 based on the gamma selection signal GAMMA_SEL.

To be specific, in one exemplary embodiment, the gamma selection signal GAMMA_SEL may be set to 0, and the interpolation operation unit 618 generates the gamma curves Curve 0 to Curve 31 based on the normal gamma curve and the preset gamma curve 1. Next, the selectors 720 to 727 respectively output the gamma selection signals CT_GMA1_CURVE_0 and CT_GMA1_CURVE_7 to the selectors 710 and 717 based on the gamma selection signal GAMMA_SEL that is set to 0. The selectors 710 and 717 select eight gamma curves from the gamma curves Curve 0 to Curve 31 based on the gamma selection signals CT_GMA1_CURVE_0 and CT_GMA1_CURVE_7, respectively. On the other hand, in another exemplary embodiment, the gamma selection signal GAMMA_SEL may be set to 1, and the interpolation operation unit 618 generates the gamma curves Curve 0 to Curve 31 based on the normal gamma curve and the preset gamma curve 2.

Next, the selectors 720 to 727 respectively output the gamma selection signals CT_GMA2_CURVE_0 and CT_GMA2_CURVE_7 to the selectors 710 and 717 based on the gamma selection signal GAMMA_SEL that is set to 1. The selectors 710 and 717 select eight gamma curves from the gamma curves Curve 0 to Curve 31 based on the gamma selection signals CT_GMA2_CURVE_0 and CT_GMA2_CURVE_7, respectively. The gamma curves Curve 0 to Curve 31 generated based on the normal gamma curve and the preset gamma curve 1 may be colder or warmer than the gamma curves Curve 0 to Curve 31 generated based on the normal gamma curve and the preset gamma curve 2.

After the gamma curves Curve A to Curve H are selected from the gamma curves Curve 0 to Curve 31 based on the gamma selection signal GAMMA_SEL, the gamma curves Curve A to Curve H are outputted to the third selector unit 613 of the gamma circuit 614. In the present embodiment, the third selector unit 613 may include the 8-to-1 selector for selecting one of the gamma curves Curve A to Curve H based on the user selection signal COLOR_STEP. The gamma voltage generating unit 615 generates gamma voltages to drive the display panel 120 based on the gamma curve selected by the third selector unit 313.

In the present embodiment, the temperature intervals between the color temperatures of the gamma curves Curve A to Curve H are substantially equal. The gamma circuit 614 gradually adjusts the color temperature of the image frame by frame based on the user selection signal COLOR_STEP, and therefore, the variation of the color temperature is smooth to provide a better user experience.

Figure 7:
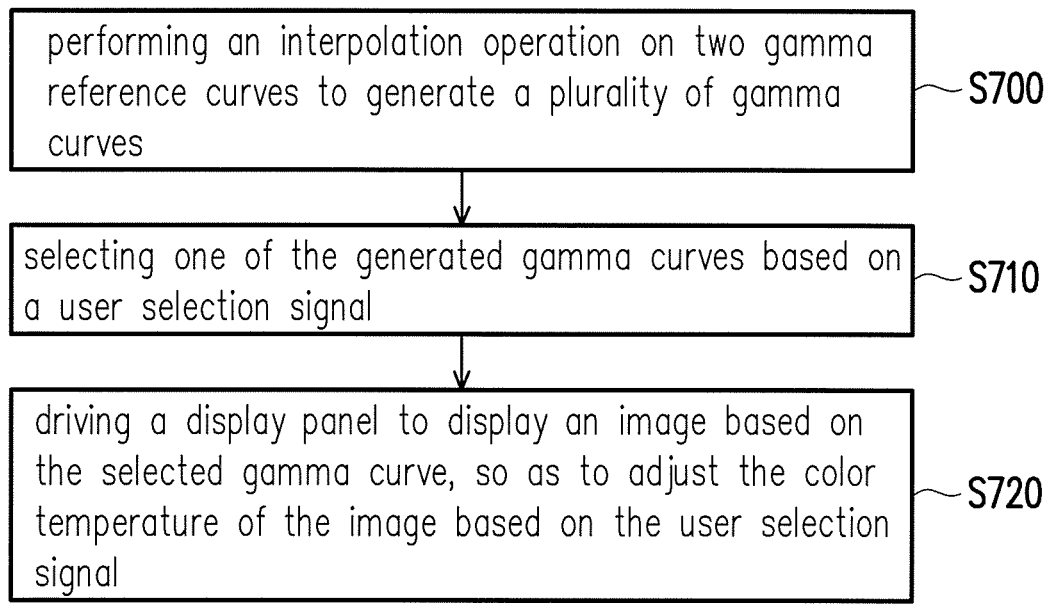
FIG. 7 illustrates a flowchart of a method for adjusting a color temperature of an image according to an exemplary embodiment of the disclosure.

FIG. 7 illustrates a flowchart of a method for adjusting a color temperature of an image according to an exemplary embodiment of the disclosure. Referring to FIG. 1, FIG. 3 and FIG. 7, the method for adjusting the color temperature of the image of the present embodiment is at least adapted to the display apparatus 100 of FIG. 1 and the display driver 310 of FIG. 3, and detailed steps of the method for adjusting the color temperature of the image of the present embodiment are described below with reference of various components in the display apparatus 100 and the display driver 310.

In step S700, the interpolation operation unit 318 performs an interpolation operation on the two gamma reference curves, e.g. the normal gamma curve and the preset gamma curve 1 or the preset gamma curve 2, to generate a plurality of gamma curves Curve 0 to Curve 31. Next, in step S710, the gamma circuit 314 selects one of the generated gamma curves Curve 0 to Curve 31 based on a user selection signal COLOR_STEP. Thereafter, in step S720, the gamma circuit 314 drives the display panel 120 to display the image based on the selected gamma curve, so as to adjust the color temperature of the image based on the user selection signal COLOR_STEP. In the present embodiment, color temperatures of the generated gamma curves Curve 0 to Curve 31 are distinct, and the generated gamma curves Curve 0 to Curve 31 have the same gamma value.

Besides, the method for adjusting the color temperature of the image described in the present embodiment of the disclosure is sufficiently taught, suggested, and embodied in the exemplary embodiments illustrated in FIG. 1 and FIG. 3, and therefore no further description is provided herein.

Figure 8:
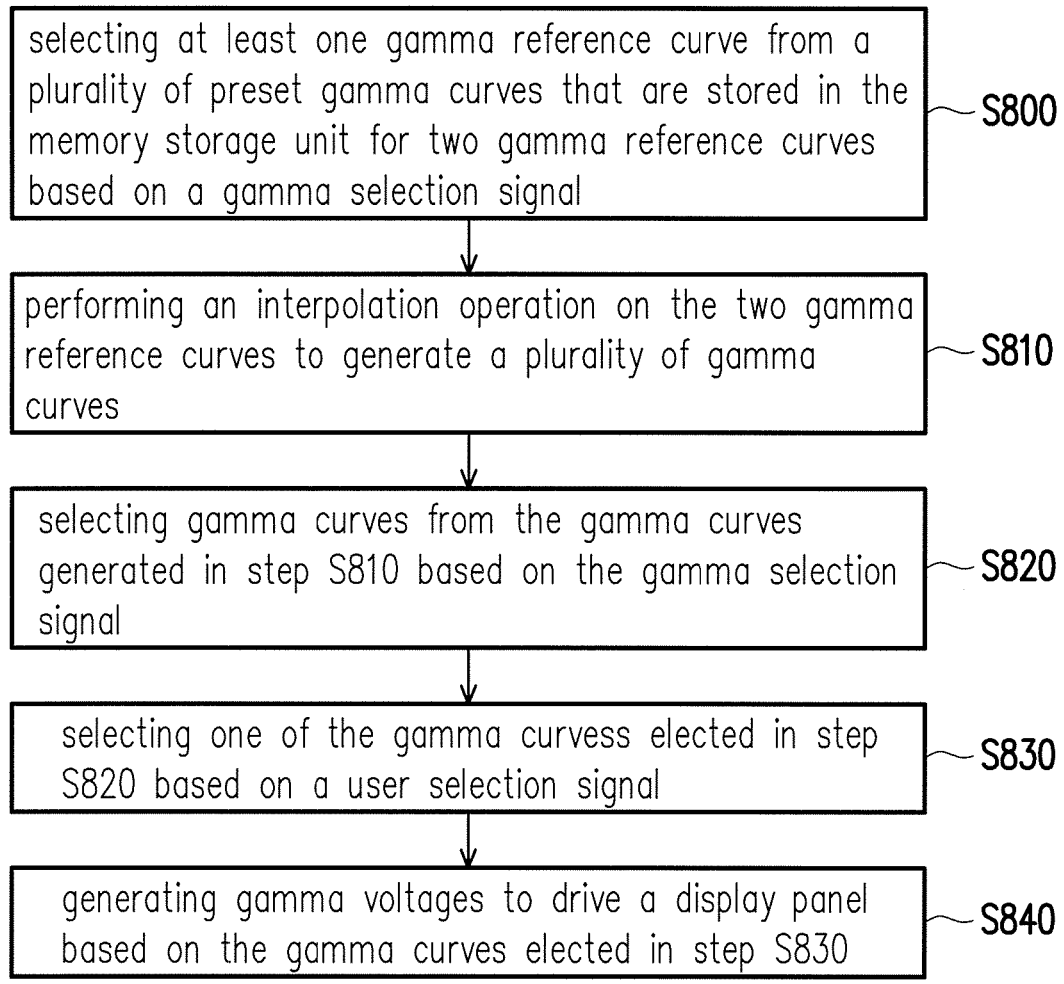
FIG. 8 illustrates a flowchart of a method for adjusting a color temperature of an image according to another exemplary embodiment of the disclosure.

FIG. 8 illustrates a flowchart of a method for adjusting a color temperature of an image according to another exemplary embodiment of the disclosure. Referring to FIG. 1, FIG. 6 and FIG. 8, the method for adjusting the color temperature of the image of the present embodiment is at least adapted to the display apparatus 100 of FIG. 1 and the display driver 610 of FIG. 6, and detailed steps of the method for adjusting the color temperature of the image of the present embodiment are described below with reference of various components in the display apparatus 100 and the display driver 610.

In step S800, the first selector unit 611 selects at least one gamma reference curve from a plurality of preset gamma curves that are stored in the memory storage unit 616 for the two gamma reference curves based on a gamma selection signal GAMMA_SEL. In step S810, the interpolation operation unit 618 performs an interpolation operation on the two gamma reference curves, e.g. the normal gamma curve and the preset gamma curve 1 or the preset gamma curve 2, to generate a plurality of gamma curves Curve 0 to Curve 31. In the present embodiment, the number of the stored preset gamma curves 1 to N is less than the number of the generated gamma curves Curve 0 to Curve 31.

Next, in step S820, the second selector unit 612 selects gamma curves Curve A to Curve H from the gamma curves Curve 0 to Curve 31 based on the gamma selection signal GAMMA_SEL. In the present embodiment, the temperature intervals between the color temperatures of the gamma curves Curve A to Curve H are substantially equal. In step S830, the gamma circuit 614 selects one of the gamma curves Curve A to Curve H based on the user selection signal COLOR_STEP. In step S840, the gamma circuit 614 generates gamma voltages to drive the display panel 120 based on the gamma curve selected in step S830. In the present embodiment, the gamma circuit 614 gradually adjusts the color temperature of the image frame by frame based on the user selection signal COLOR_STEP.

Besides, the method for adjusting the color temperature of the image described in the present embodiment of the disclosure is sufficiently taught, suggested, and embodied in the exemplary embodiments illustrated in FIG. 1 and FIG. 6, and therefore no further description is provided herein.

In summary, in the exemplary embodiments, the interpolation operation unit generates a plurality of gamma curves according to two gamma reference curves that are selected from the preset gamma curves stored in memory storage unit. The number of the stored preset gamma curves is less than the number of the generated gamma curves. The manufacturing cost of the whole display driver is reduced. In addition, the generated gamma curves are further selected, such that color temperatures of the selected gamma curves are distributed at substantially equal temperature intervals. The gamma circuit gradually adjusts the color temperature of the image frame by frame according to the selected gamma curves for smoothing the variation of the color temperature. Therefore, a better user experience is provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display driver, configured to drive a display panel to display an image, and comprising:
    an interpolation operation circuit, configured to receive two gamma reference curves, and perform an interpolation operation on the two gamma reference curves to generate a plurality of gamma curves;
    a gamma circuit, electrically connected to the interpolation operation circuit, and configured to select one of the generated gamma curves based on a user selection signal, and drive the display panel to display the image based on the selected gamma curve, so as to adjust a color temperature of the image based on the user selection signal, wherein color temperatures of the generated gamma curves are distinct, and the generated gamma curves have the same gamma value; and
    a selector circuit, electrically connected to the interpolation operation circuit, and configured to select at least one gamma reference curve from a plurality of preset gamma curves for the two gamma reference curves based on a gamma selection signal, and output the at least one gamma reference curve selected by the selector circuit to the interpolation operation circuit,
    wherein the preset gamma curves comprise two gamma curves, and a color temperature of one of the two gamma curves is greater than a color temperature of another one of the two gamma curves, wherein the selector circuit selects the two gamma curves for the two gamma reference curves based on the gamma selection signal.

2. The display driver according to claim 1, further comprising:
    an another selector circuit, electrically connected to the interpolation operation circuit, and configured to select a plurality of gamma curves from the generated gamma curves based on an another gamma selection signal,
    wherein color temperatures of the gamma curves selected by the another selector circuit are distributed at substantially equal temperature intervals.

3. The display driver according to claim 2, wherein the gamma circuit gradually adjusts the color temperature of the image frame by frame based on the user selection signal.

4. The display driver according to claim 2, wherein the gamma circuit comprises:
    a yet another selector circuit, electrically connected to the another selector circuit, and configured to select one gamma curve from the gamma curves selected by the another selector circuit based on the user selection signal; and
    a gamma voltage generating circuit, electrically connected to the yet another selector circuit, and configured to generate gamma voltages to drive the display panel based on the gamma curve selected by the yet another selector circuit.

5. The display driver according to claim 1, wherein the gamma circuit comprises:
    an another selector circuit, electrically connected to the interpolation operation, and configured to select one gamma curve from the gamma curves generated by the interpolation operation based on the user selection signal; and
    a gamma voltage generating circuit, electrically connected to the another selector circuit, and configured to generate gamma voltages to drive the display panel based on the gamma curve selected by the another selector circuit.

6. The display driver according to claim 1, further comprising:
    a memory storage circuit, electrically connected to the interpolation operation circuit, and configured to store the preset gamma curves,
    wherein the two gamma reference curves are selected from the preset gamma curves and outputted to the interpolation operation circuit.

7. The display driver according to claim 6, wherein a number of the stored preset gamma curves is less than a number of the generated gamma curves.

8. A method for adjusting a color temperature of an image, comprising:

selecting at least one gamma reference curve by a selector circuit from a plurality of preset gamma curves for two gamma reference curves based on a gamma selection signal;

performing an interpolation operation on the two gamma reference curves to generate a plurality of gamma curves;

selecting one of the generated gamma curves based on a user selection signal; and driving a display panel to display an image based on the selected gamma curve, so as to adjust the color temperature of the image based on the user selection signal, wherein color temperatures of the generated gamma curves are distinct, and the generated gamma curves have the same gamma value, wherein the preset gamma curves comprise the two gamma curves, and a color temperature of one of the two gamma curves is greater than a color temperature of another of the two gamma curves, and wherein the step of selecting the at least one gamma reference curve by the selector circuit from the preset gamma curves for the two gamma reference curves comprises:

selecting the two gamma curves for the two gamma reference curves based on the gamma selection signal.

9. The method according to claim 8, further comprising:

selecting a plurality of gamma curves by an another selector circuit from the generated gamma curves based on the gamma selection signal, wherein color temperatures of the gamma curves selected by the another selector circuit are distributed at substantially equal temperature intervals.

10. The method according to claim 9, wherein the color temperature of the image is adjusted frame by frame based on the user selection signal.

11. The method according to claim 9, wherein in the step of selecting the one of the generated gamma curves based on the user selection signal, one gamma curve is selected by a yet another selector circuit from the selected gamma curves based on the user selection signal by the another selector circuit, and in the step of driving the display panel to display the image based on the selected gamma curve, gamma voltages are generated to drive the display panel by the yet another selector circuit based on the selected gamma curve.

12. The method according to claim 8, wherein in the step of selecting the one of the generated gamma curves based on the user selection signal, one gamma curve is selected by an another selector circuit from the generated gamma curves based on the user selection signal, and in the step of driving the display panel to display the image based on the selected gamma curve, gamma voltages are generated to drive the display panel by the another selector circuit based on the selected gamma curve.

13. The method according to claim 8, further comprising:

storing the preset gamma curves, wherein the two gamma reference curves are selected from the preset gamma curves, and a number of the stored preset gamma curves is less than a number of the generated gamma curves.

14. A display driver, configured to drive a display panel to display an image, and comprising:

an interpolation operation circuit, configured to receive two gamma reference curves, and perform an interpolation operation on the two gamma reference curves to generate a plurality of gamma curves;

a gamma circuit, electrically connected to the interpolation operation circuit, and configured to select one of the generated gamma curves based on a user selection signal, and drive the display panel to display the image based on the selected gamma curve, so as to adjust a color temperature of the image based on the user selection signal, wherein color temperatures of the generated gamma curves are distinct, and the generated gamma curves have the same gamma value; and a selector circuit, electrically connected to the interpolation operation circuit, and configured to select at least one gamma reference curve from a plurality of preset gamma curves for the two gamma reference curves based on a gamma selection signal, and output the at least one gamma reference curve selected by the selector circuit to the interpolation operation circuit, wherein the preset gamma curves comprise a first gamma curve, a second gamma curve, and a third gamma curve, a color temperature of the first gamma curve is greater than a color temperature of the second gamma curve, and the color temperature of the second gamma curve is greater than a color temperature of the third gamma curve, and wherein the selector circuit selects the first gamma curve or the third gamma curve for one of the two gamma reference curves based on the gamma selection signal, and the interpolation operation circuit receives the second gamma curve for another one of the two gamma reference curves.

15. A method for adjusting a color temperature of an image, comprising:

selecting at least one gamma reference curve by a selector circuit from a plurality of preset gamma curves for two gamma reference curves based on a gamma selection signal;

performing an interpolation operation on the two gamma reference curves to generate a plurality of gamma curves;

selecting one of the generated gamma curves based on a user selection signal; and driving a display panel to display an image based on the selected gamma curve, so as to adjust the color temperature of the image based on the user selection signal, wherein color temperatures of the generated gamma curves are distinct, and the generated gamma curves have the same gamma value, wherein the preset gamma curves comprise a first gamma curve, a second gamma curve, and a third gamma curve, a color temperature of the first gamma curve is greater than a color temperature of the second gamma curve, and the color temperature of the second gamma curve is greater than a color temperature of the third gamma curve, wherein the step of selecting the at least one gamma reference curve by the selector circuit from the preset gamma curves for the two gamma reference curves comprises:

selecting the first gamma curve or the third gamma curve for one of the two gamma reference curves based on the gamma selection signal; and receiving the second gamma curve for another one of the two gamma reference curves.

* * * * *